United States Patent
Mittal et al.

(10) Patent No.: US 11,794,774 B2
(45) Date of Patent: Oct. 24, 2023

(54) REAL-TIME DYNAMIC TRAFFIC SPEED CONTROL

(71) Applicant: Ford Global Technologies, LLC, Dearborn, MI (US)

(72) Inventors: Archak Mittal, Canton, MI (US); Yifan Chen, Ann Arbor, MI (US); Eric H. Wingfield, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 17/203,154

(22) Filed: Mar. 16, 2021

(65) Prior Publication Data

US 2022/0297719 A1   Sep. 22, 2022

(51) Int. Cl.
*B60W 60/00* (2020.01)
*B60W 40/09* (2012.01)
(Continued)

(52) U.S. Cl.
CPC ........ *B60W 60/001* (2020.02); *B60W 30/143* (2013.01); *B60W 40/04* (2013.01);
(Continued)

(58) Field of Classification Search
None
See application file for complete search history.

(56) References Cited

U.S. PATENT DOCUMENTS

| 10,762,358 B2 | 9/2020 | Myers et al. |
| 2013/0138591 A1* | 5/2013 | Ricci ................. G06Q 50/26 706/46 |

(Continued)

FOREIGN PATENT DOCUMENTS

AU    2017100399 A4    5/2017

OTHER PUBLICATIONS

Qianwen Chao et al, "A Survey on Visual Traffic Simulation: Models, Evaluations, and Applications in Autonomous Driving," Computer Graphics Forum, vol. 38 (2019), No. 2, published by The Eurogaphics Association and John Wiley & Sons Ltd., Jul. 18, 2019, 22 pages.

(Continued)

*Primary Examiner* — Alan D Hutchinson
*Assistant Examiner* — Andy Schneider
(74) *Attorney, Agent, or Firm* — Brandon Hicks; Eversheds Sutherland (US) LLP (57) ABSTRACT

The present disclosure is directed to method for controlling an autonomous or human-driven vehicle that can include receiving, via a processor a vehicle communication indicative of a traffic flow parameter, and determining, based on the vehicle communication, a driver behavior characteristic, determining, via the processor and based on a historic driver behavior record, a driver performance characteristic, generating, via the processor, a first speed assignment and a lane assignment and associated with the vehicle and causing to transmit a first speed and lane assignment message to the vehicle. The system uses enhanced sensing technology within a connected environment to observe vehicle speeds and other vehicle patterns to ingest real-time, road network patterns of vehicle behavior, manages traffic through simulation, and sends messages to dynamic lane management controls such as signage, V2V communication, etc.

16 Claims, 4 Drawing Sheets

(51) Int. Cl.
*B60W 40/04* (2006.01)
*H04W 4/44* (2018.01)
*B60W 30/14* (2006.01)
*B60W 40/105* (2012.01)

(52) U.S. Cl.
CPC .......... *B60W 40/09* (2013.01); *B60W 40/105* (2013.01); *H04W 4/44* (2018.02); *B60W 2540/30* (2013.01); *B60W 2555/60* (2020.02); *B60W 2556/10* (2020.02); *B60W 2556/50* (2020.02)

(56) References Cited

U.S. PATENT DOCUMENTS

2020/0201353 A1* 6/2020 Martin ............... G01C 21/3415
2021/0012652 A1* 1/2021 Kong ............... G08G 1/096861

OTHER PUBLICATIONS

Kresumir Kusic et al, "An Overview of Reinforcement Learning Methods for Variable Speed Limit Control", MDPI Applied Sciences, Faculty of Transport and Traffic Sciences, University of Zagreb, Zagreb, Croatia, Jul. 17, 2020, 19 pages.

* cited by examiner

FIG. 4

REAL-TIME DYNAMIC TRAFFIC SPEED CONTROL

TECHNICAL FIELD

The present disclosure relates to traffic management systems, and more particularly, to real-time dynamic traffic speed control.

BACKGROUND

Shockwaves or traffic waves are disturbances in a traffic flow on a highway or surface street. Shockwaves in traffic can result in poor traffic flow and congestion on the roadways. Extensive research has shown that shockwaves are directly related to high vehicle speed variation in the flow traffic.

Phantom traffic jams are one type of traffic shockwave that occurs for no apparent reason. Often occurring as a response to a single stimulus, such as a sudden braking action by a driver, the following driver will also abruptly brake, which can cause a chain of traffic disruption that propagates to an overall slowdown and inconsistent traffic flow.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to a dynamic vehicle and traffic control system that improves traffic flow by controlling dynamic speed limits and lane usage. An adaptive machine learning-based approach may continuously manage human-driven and autonomously-driven traffic based on the prevailing condition and vehicle driver reaction that are observed by the system in real-time and received from a historical user driving record.

In some aspects, an edge computing system may be disposed as part of roadway infrastructure and vehicle infrastructure to manage localized traffic throughput. The edge computing system may receive vehicle data from multiple sources that can include Vehicle-to-Infrastructure (V2I) data transmission, enabled roadside units (RSUs), lane-specific speed sensors, and/or other technologies configured and/or programmed to provide vehicle and driver data that support Lane-Based Dynamic Speed Limit (LbDSL) methodologies. For example, the dynamic vehicle and traffic control system may include LiDAR and other sensory devices to receive real-time traffic and driver inputs used to generate a microscopic traffic simulation model that generates inputs to a speed-lane determining algorithm.

The edge computing system may determine vehicle traffic lanes and cluster similar vehicle speeds and capabilities according to observed and predicted driver behavior. For example, a vehicle group having a fast response rate and higher speed capability may receive a higher speed limit assignment, and may be grouped in a particular high speed lane. A vehicle group having relatively lower response rates and lower vehicle speed capability may receive a lower speed limit assignment and be grouped in a lower relative speed lane. Further, with connected vehicles, the dynamic vehicle and traffic control system may incorporate vehicle destinations or routes while making the speed and lane determinations to anticipate approaching highway exits or entry points and turns.

In other aspects, the system may deliver these messages via Vehicle-to-Infrastructure (V2I) communication and Vehicle-to-Vehicle (V2V) communication. For example, the speed-lane determining algorithm can determine vehicle lane groups and optimized vehicle speed by generating and transmitting messages for autonomous vehicle control, for display to human drivers (when the vehicle is a non-autonomous vehicle), as well as display on infrastructure such as overhead variable message signs.

ILLUSTRATIVE EMBODIMENTS

The disclosure will be described more fully hereinafter with reference to the accompanying drawings, in which example embodiments of the disclosure are shown, and not intended to be limiting.

Figure 1:
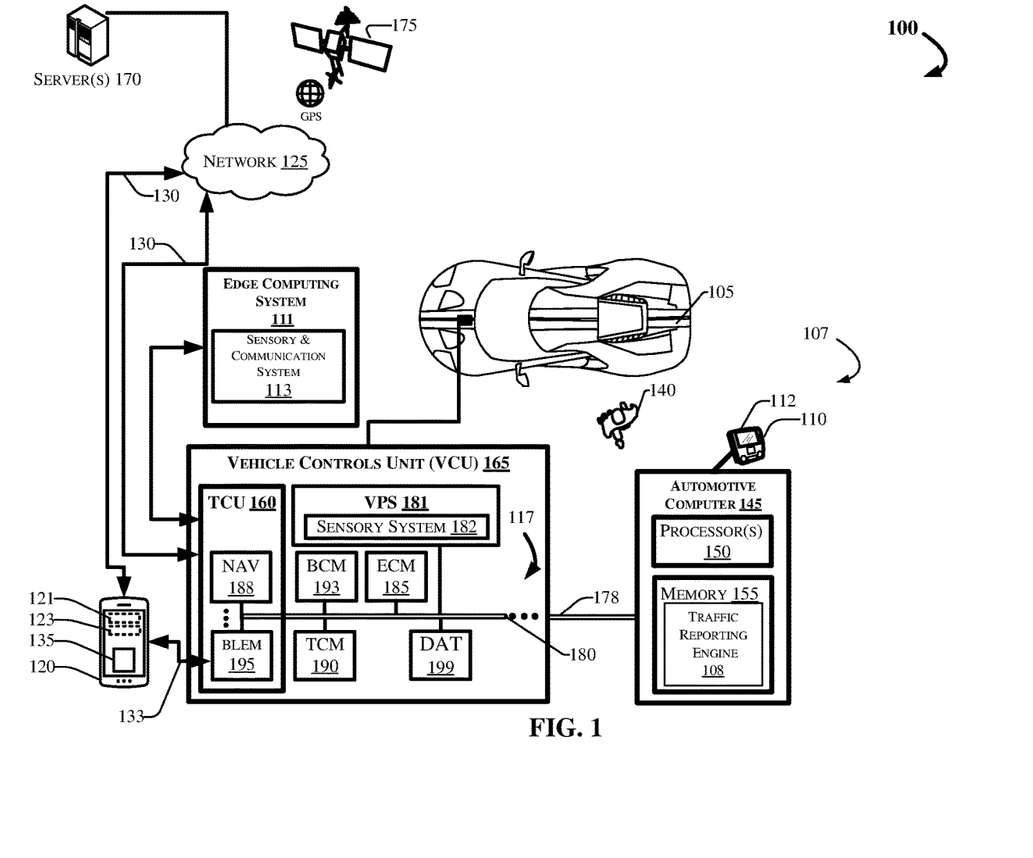
FIG. 1 depicts an example computing environment in which techniques and structures for providing the systems and methods disclosed herein may be implemented.

FIG. 1 depicts an example computing environment 100 that can include a vehicle 105, disposed in communication with an edge computing system 111. The vehicle 105 may include an automotive computer 145, and a Vehicle Controls Unit (VCU) 165 that can include a plurality of electronic control units (ECUs) 117 disposed in communication with the automotive computer 145. A mobile device 120, which may be associated with a user 140, the vehicle 105, and/or the edge computing system 111, may connect with the automotive computer 145 and the edge computing system 111 using wired and/or wireless communication protocols and transceivers. The mobile device 120 may be communicatively coupled with the vehicle 105 and the edge computing system 111 via one or more network(s) 125, which may communicate via one or more wireless connection(s) 130, and/or may connect with the vehicle 105 directly using near field communication (NFC) protocols, Bluetooth® protocols, Wi-Fi, Ultra-Wide Band (UWB), Dedicated Short Range Communication (DSRC) and other possible data connection and sharing techniques.

The vehicle 105 and/or the edge computing system 111 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network. In some embodiments, the vehicle 105 may utilize a combination of GPS and Dead Reckoning responsive to determining that a threshold number of satellites are not recognized.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a coordinated or non-coordinated vehicle fleet.

Although illustrated as a sport utility (as shown hereafter in FIG. 3) or sport vehicle (as shown in FIG. 1), the vehicle 105 may take the form of another passenger or commercial automobile such as, for example, a car, a truck, a crossover vehicle, a van, a minivan, a taxi, a bus, etc., and may be configured and/or programmed to include various types of automotive drive systems. Example drive systems can include any type of internal combustion engines (ICEs) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system failure.

Level-5 AVs may include fully autonomous vehicle systems that require no human input for operation, and may not include human operational driving controls.

According to embodiments of the present disclosure, the dynamic Vehicle and Traffic Control system 107 may be configured and/or programmed to operate with a human-controlled vehicle, or an autonomous or semi-autonomous vehicle (AV) having a Level-1 through Level-5 autonomous vehicle controller. An example AV controller 300 is described in greater detail with respect to FIG. 3. Accordingly, the dynamic Vehicle and Traffic Control system 107 may provide some aspects of human control to the vehicle 105, when the vehicle is configured as an AV.

The mobile device 120 can include a memory 123 for storing program instructions associated with an application 135 that, when executed by a mobile device processor 121, performs aspects of the disclosed embodiments such as displaying traffic control messages and providing current traffic flow conditions, driver behavior information, and historic driver behaviors. The application (or "app") 135 may be part of the dynamic Vehicle and Traffic Control system 107, or may provide information to the dynamic Vehicle and Traffic Control system 107 and/or receive information from the dynamic Vehicle and Traffic Control system 107.

In some aspects, the mobile device 120 may communicate with the vehicle 105 through the one or more wireless connection(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless connection(s) 130 are depicted in FIG. 1 as communicating via the one or more network(s) 125, and via one or more wireless connection(s) 133 that can be direct connection(s) between the vehicle 105 and the mobile device 120. The wireless connection(s) 133 may include various low-energy protocols including, for example, Bluetooth®, Bluetooth® Low-Energy (BLE®), UWB, Near Field Communication (NFC), Dedicated Short Range Communication (DSRC) or other protocols.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the dynamic Vehicle and Traffic Control system 107, in accordance with the disclosure. The automotive computer 145 may include one or more processor(s) 150 and a computer-readable memory 155. The memory 155 may include program instructions that can include a traffic reporting engine 108 that provides traffic information such as traffic speed, traffic density, driver information such as identity, driving habits, and other features discussed in various embodiments of the present disclosure.

The one or more processor(s) 150 may communicate information with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a dynamic vehicle and traffic control program code. The memory 155 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Driver Assistances Technologies (DAT) controller 199, etc. The VCU 165 may further include and/or communicate with a Vehicle Perception System (VPS) 181, having connectivity with and/or control of one or more vehicle sensory system(s) 182. In some aspects, the VCU 165 may control operational aspects of the vehicle 105, and implement one or more instruction sets received from the application 135 operating on the mobile device 120, from one or more instruction sets stored in computer memory 155 of the automotive computer 145, including instructions operational as part of the dynamic Vehicle and Traffic Control system 107, and or instructions and communications received from the edge computing system 111.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a BLE® Module (BLEM) 195, a Wi-Fi transceiver, a UWB transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the dynamic Vehicle and Traffic Control system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the dynamic Vehicle and Traffic Control system 107, and/or via wireless signal inputs received via the wireless connection(s) 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

The DAT controller 199, when included, may provide aspects of Level-1 through Level-4 automated driving and driver assistance functionality that can include, for example, active parking assistance, trailer backup assistance, adaptive cruise control, lane keeping, and/or driver status monitoring, among other features. The DAT controller 199 may also provide aspects of user and environmental inputs usable for user authentication. Authentication features may include, for example, biometric authentication and recognition.

The DAT controller 199 can obtain input information via the sensory system(s) 182, which may include sensors disposed on the vehicle interior and/or exterior (sensors not shown in FIG. 1). In some aspects, the DAT may also receive and send communication from and to the edge computing system 111. The DAT controller 199 may receive the sensor information associated with driver functions, vehicle functions, and environmental inputs, and other information. The DAT controller 199 may characterize the sensor information for identification of drivers using data stored and received in a secure data vault (not shown in FIG. 1) onboard the vehicle 105 and/or via the server(s) 170.

In other aspects, the DAT controller 199 may also be configured and/or programmed to provide driver assistance when the vehicle 105 includes Level-1 through Level-3 autonomous vehicle driving features. The DAT controller 199 may connect with and/or include the VPS 181, which may include internal and external sensory systems (collectively referred to as sensory systems 182). The sensory systems 182 may be configured and/or programmed to obtain sensor data usable for performing driver assistances operations such as, for example, lane keeping, speed control, active parking, trailer backup assistances, adaptive cruise control, driver status monitoring, and/or other features.

The computing system architecture of the automotive computer 145, VCU 165, and/or the dynamic Vehicle and Traffic Control system 107 may omit certain computing modules. It should be readily understood that the computing environment depicted in FIG. 1 is an example of a possible implementation according to the present disclosure, and thus, it should not be considered limiting or exclusive.

The automotive computer 145 may connect with an infotainment system 110 that may provide an interface for the navigation and GPS receiver 188, and the dynamic Vehicle and Traffic Control system 107. The infotainment system 110 may include a touchscreen interface portion 112, and may include voice recognition features, biometric identification capabilities that can identify users based on facial recognition, voice recognition, fingerprint identification, or other biological identification means. In other aspects, the infotainment system 110 may provide user identification using mobile device pairing techniques (e.g., connecting with the mobile device 120, a Personal Identification Number (PIN)) code, a password, passphrase, or other identifying means.

The edge computing system 111 may be an infrastructure-connected roadside computer that monitors traffic and communicates with connected vehicles as they operate on a proximate roadway. The edge computing system 111 may include standard computing elements (not shown) such as a processor, computer-readable memory, and a power source. A sensory and communication system 113 may connect with and/or be integrated with the edge computing system 111, and include a plurality of sensory devices such as RADAR sensors, SONAR sensors, camera systems, GPS, and LiDAR sensory devices, among others.

Figure 2:
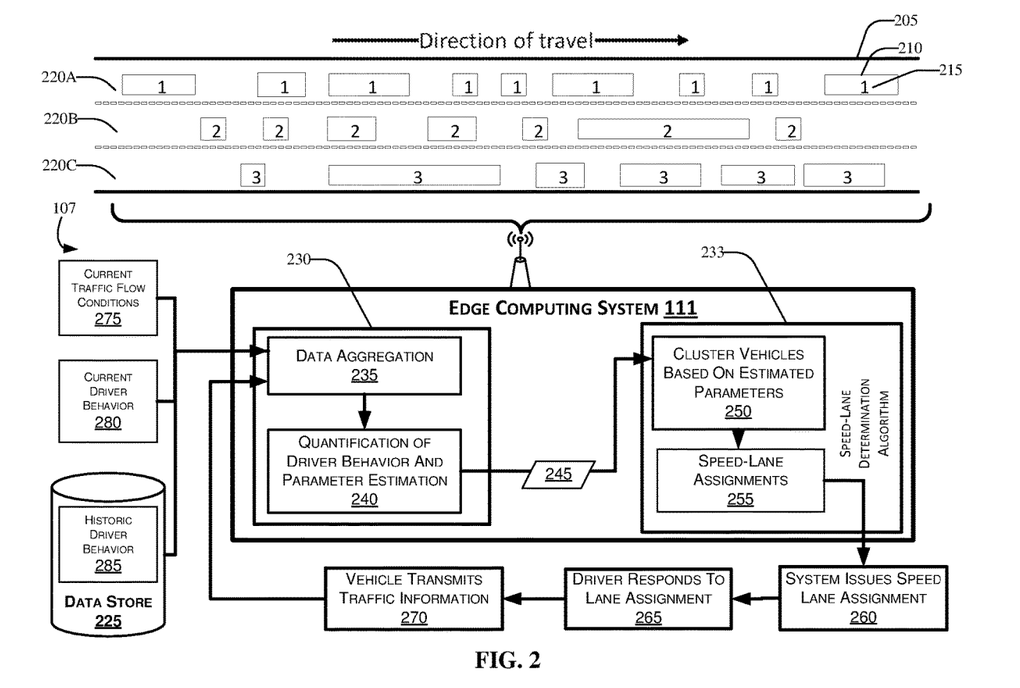
FIG. 2 illustrates a block flow diagram of an edge computing system in accordance with the present disclosure.

The edge computing system 111, described in greater detail with respect to FIG. 2, may include computer readable memory and a processing system configured for speed-lane determination using driver and vehicle performance parameters received from connected vehicles (e.g., the vehicle 105), and from data stores having traffic flow conditions, driver behavior information, map and infrastructure information, among other things.

The edge computing system 111 may connect with the TCU 160 of the vehicle 105 wirelessly, and connect with the server(s) 170 via the network(s) 125 using the sensory and communication system 113. The edge computing system 111 may further communicate with other V2I-enabled devices such as one or more roadside units (RSUs), lane-specific speed sensors (not shown in FIG. 1), or other devices and systems that support LbDSL methodologies.

FIG. 2 illustrates a block flow diagram of the edge computing system 111 operating near a roadway 205, in accordance with the present disclosure. The edge computing system 111 includes a microscopic modeling system 230 and a speed-lane determination processor 233, which may be stored in a computer memory (not shown) and implemented by a computing system processor (not shown in FIG. 2) of the edge computing system 111.

According to one embodiment, the dynamic Vehicle and Traffic Control system 107 may utilize an adaptive machine learning-based approach to continuously manage traffic based on the prevailing condition and reactions of the drivers. The dynamic Vehicle and Traffic Control system 107 may utilize traditional relationships and observed speed variability to density relationship to leverage historical and real-speed-flow-density time data. The dynamic Vehicle and Traffic Control system 107 may use as one input, vehicle data and historic driver behavior information to provide flexible and dynamic traffic control for vehicle traffic that includes AV, semi-AV, and human-driven vehicles.

More particularly, the dynamic Vehicle and Traffic Control system 107 may receive current traffic flow conditions received from speed cameras (not shown in FIG. 2) that collect speed information associated with vehicle traffic of the vehicles 215 on a roadway 205. Additionally, one or more RSUs (not shown in FIG. 2) may provide other relevant data, including precipitation information, visibility information, and other data as inputs.

The dynamic Vehicle and Traffic Control system 107 may also receive current driver behavior information 280 received from vehicle communications from one or more vehicles 215 operating on the roadway 205. Driver behavior information may include vehicle speed observations such as average speed, average speed change with respect to time, lane changing behavior (e.g., a number of lane changes with respect to time), and other behaviors.

The historic driver behavior information 285 may be collected using a data store and received by the microscopic modeling system 230. According to an embodiment, the microscopic modeling system 230 map create a microscopic traffic model using by data aggregation 235, which aggregates the current traffic flow conditions 275, the current driver behavior information 280, and the historic driver behavior information 285. The dynamic Vehicle and Traffic Control system 107 may output the aggregated data for a quantification of driver behavior and parameter estimation step 240. This step includes predicting the driver behavior using the current driving behavior information 280 and historic driver behavior information 285 during as they correspond with historic traffic flow conditions 275 recorded and stored in the data store 225. The data store 225 may be a dedicated traffic data storage device located proximate to and/or integrated with the edge computing system 111. According to another embodiment, the data store 225 may be disposed as a local data storage in the vehicle(s) 215, and sent to the edge computing system 111 as part of a vehicle communication from the vehicle(s) 215 to the edge computing system 111.

The microscopic modeling system 230 may send driver/vehicle performance parameters 245 to the speed-lane determination processor 233, which may cluster vehicles 215 according to estimated parameters at step 250. For example, at this step, the edge computing system 111 may group vehicles with a relatively fast response rate (e.g., 1 second, 5 seconds, 20 seconds) and higher speed capability (e.g., 60 MPH, 80 MPH, 95 MPS, etc.) by placing similar speed capabilities and compliance with recommendations in lanes having a higher average speed. For example, a plurality of lanes on the roadway 220 are shown: a first lane 220A, second lane 220B, and a third lane 220C, where the first lane may be designated the fastest lane, and the lane 220C may be designated the slowest lane. The drivers/vehicles having a current and/or historical observed response time (that is, a time from which the driver/vehicle receives a speed or lane change instruction to the time that the instruction is followed) may receive a higher speed limit and will travel in the first lane. This predictive analytic may be provided by a machine learning algorithm that formulates a prediction according to prior circumstances and driving habits that correspond with present conditions.

Also included in this determination is the vehicle type, average speed observed by the vehicle/driver, and speed capabilities of the vehicle. Speed capabilities may be determined based on vehicle model, year, and other factors that can be determined by a vehicle to the edge computing system 111 communication received wirelessly by the edge computing system 111.

According to another embodiment, the clustering step may be determined based on a final destination associated with the vehicle 215. The connected vehicles 215 can provide their destinations or routes to the edge computing system 111. Accordingly, the edge computing system 111 may accommodate a lane position according to where the vehicle 215 is with respect to their destination, including positioning the vehicle in an appropriate lane with respect to a predicted roadway exit point (not shown in FIG. 2). Taking this information into account, the speed-lane determination algorithm 233 may assign the vehicle(s) 215 appropriate lanes, which may reduce interruption to traffic flow.

The speed-lane determination algorithm 233 may generate a speed lane assignment 260, to which a human driver and/or an autonomous vehicle responds at step 265. Speed-lane assignments 255 may be transmitted to the vehicle 215, to infrastructure signage indicating which of the lanes 220A-220C correspond to an instructed target traffic speed, to the mobile device 120 which may be viewable by the driver (not shown) while en route, and/or to the vehicle infotainment system 210 which may output the instruction on the touchscreen interface 112 of the infotainment system 110, and/or output audible instructions, or instructions viewable on a heads-up display or wearable interactive device such as smart glasses.

Although compliance is easily predictable to be immediate when the vehicle may safely comply with the instruction, human drivers may be less inclined to comply depending on the flexibility and mood of the driver. Accordingly, at step 265, the observed response time of the driver to a given instruction may be stored by the data store 225, and used in the data aggregation step 235 at future iterations, where the predictive analytics may continually self-improve when predicting that driver's predicted compliance. As the vehicle driver (not shown in FIG. 2) responds to the lane assignments, the vehicle 215 may transmit this information to the 230.

Figure 3:
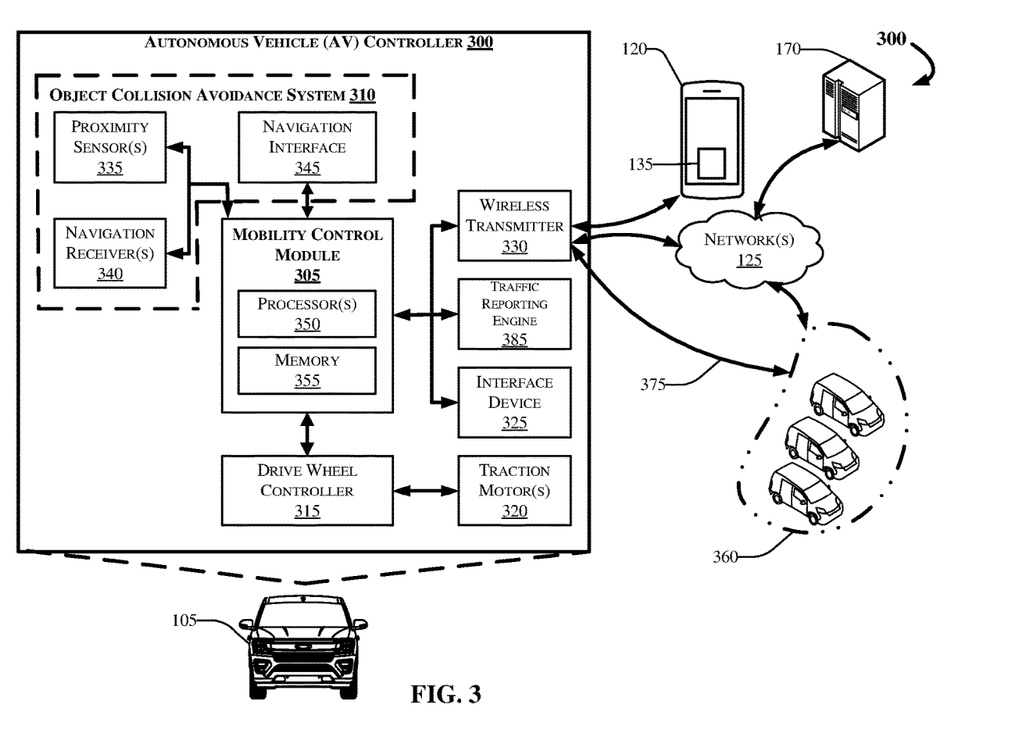
FIG. 3 depicts a schematic of an autonomous vehicle control system configured and/or programmed to operate with the edge computing system of FIG. 2 in accordance with the present disclosure.

FIG. 3 depicts a schematic of an autonomous vehicle control system 300 configured and/or programmed to operate with the edge computing system of FIG. 2 in accordance with the present disclosure.

FIG. 3 depicts a block diagram of an example autonomous vehicle controller 300, in accordance with embodiments. The AV controller 300 may include an object collision avoidance system 310 disposed in communication with a mobility control module 305. The object collision avoidance system 310 may perform object detection, navigation, and provide navigational interactive control features. The mobility control module 305 may be configured and/or programmed to receive data from the object collision avoidance system 310 to provide vehicle control.

The AV controller 300 may be disposed in communication with and/or include the dynamic Vehicle and Traffic Control system 107, in accordance with embodiments described herein. For example, a traffic reporting engine 385 may also serve as an interface that receives instructions from the dynamic Vehicle and Traffic Control system 107 for lane changes, speed changes, and other instructions, and transmit the instruction to the mobility control module 305 for execution by controlling a complying action by the vehicle when such action is safe to perform in the operational environment.

The mobility control module 305 may include one or more processor(s) 350, and a memory 355. The processor(s) 350 may be one or more commercially available general-purpose processor(s), such as a processor from the Intel® or ARM® architecture families. In some aspects, the mobility control module 305 may be implemented in a system on a chip (SoC) configuration, to include other system components such as RAM, flash storage and I/O buses. Alternatively, mobility control module 305 can be implemented using purpose-built integrated circuits, or any other suitable technology now known or later developed.

The memory 355 may include executable instructions implementing the basic functionality of the AV controller 300 and a database of locations in geographic area. For example, the mobility control module 305 may connect with a drive wheel controller 315. The drive wheel controller 315 may communicate signals to one or more traction motor(s) 320, which may embody a drive mechanism, such as a brushless direct current (DC) motor, or another traction motor technology. The mobility control module 305 may cause the drive wheel controller 315 to transmit motive signals to the traction motor(s) 320 to the vehicle 105.

The AV controller 300 may further include an interface device 325 having input and output surfaces (not shown in FIG. 3) for providing interactive access to users onboard the AV (e.g., the vehicle 105). For example, the interface device 325 may include a touch screen interface surface configured and/or programmed to provide operational information such as power consumption information, battery health, battery level, etc. In some embodiments, the interface device 325 may further provide control features for controlling other motive aspects of the vehicle 105, such as braking, acceleration, etc.

The interface device 325 may also communicate information to and from the navigation interface 345, and/or be integral with the navigation interface 345 such that they share a common touch screen interface. The interface device 325, either alone or in conjunction with the navigation interface 345, may provide control prompts such as speed up, slow down, switch lanes, prepare to exit, etc.

The vehicle 105 may be further configured and/or programmed to communicate information with other devices and vehicles using a wireless transmitter 330. The wireless transmitter 330 may communicate with one or more other vehicles in the fleet 360, and/or a central routing computer (e.g., the server(s) 170 as described with respect to FIG. 1) using a wireless communication network such as, for example, the network(s) 125. The network(s) 125 may be the Internet, a private network, a cellular telephone provider's data network, or other network infrastructure such as, for example, a vehicle-to-vehicle communication network. An example of a vehicle-to-vehicle communication protocol may be, for example, a dedicated short-range communication (DSRC) protocol.

The AV controller 300 may be disposed in communication with the network 125. The vehicle 105 may communicate with one or more other vehicles in a fleet of vehicles 365 in various ways, including via an indirect communication channel 370 using the network(s) 125, and/or via any number of direct communication channels 375.

The object collision avoidance system 310 may include one or more proximity sensor(s) 335, one or more navigation receiver(s) 340, and a navigation interface 345 through which users of the AV controller 300 may provide trip destination information, and execute speed and lane change instructions received from the dynamic Vehicle and Traffic Control system 107. The object collision avoidance system 310 may communicate control signals to a mobile device application (e.g., the application(s) 135 described with respect to FIG. 1).

The object collision avoidance system 310 may provide route management and communication between one or more other vehicles in the fleet, and to the operator of the vehicle. The mobility control module 305 may receive navigational data from the navigation receiver(s) 340 and the proximity sensor(s) 335, determine a navigational path from a first location to a second location, and provide instructions to the drive wheel controller 315 for autonomous, semi-autonomous, and/or manual operation.

The navigation receiver(s) 340 can include one or more of a global positioning system (GPS) receiver, and/or other related satellite navigation systems such as the global navigation satellite system (GLNSS), Galileo, or other similar systems known in the art of autonomous vehicle operation. Additionally, the navigation receiver(s) 340 can be configured and/or programmed to receive locally based navigation cues to aid in precise navigation through space-restricted areas, such as, for example, in a crowded street, and/or in a distributed beacon environment. When deployed in conjunction with a distributed beacon network (not shown in FIG. 3), locally based navigation cues can include communication with one or more purpose-built location beacons (not shown in FIG. 3) placed throughout a geographic area. The navigation cues may enable an increased Level-of navigation precision and provide specific indicators for locations of various points of interest. In other aspects, the navigation receiver(s) 340 may include one or more navigation transceivers (not shown in FIG. 3) for communication with mobile network infrastructure for cell tower triangulation and use of known-location Wi-Fi hotspots. Any location technology now known or later developed that can provide a high precision location (e.g. preferably within a linear foot) can be useful as part of navigation receiver(s) 340.

The proximity sensor(s) 335 may work in connection with the navigation receiver(s) 340 to provide situational awareness to mobility control module 305 for autonomous navigation. For example, the proximity sensors may include one or more Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The proximity sensor(s) 335 may alert the mobility control module 305 to the presence of sensed obstacles, and provide trajectory information to the mobility control module 305, where the trajectory information is indicative of moving objects or people that may interact with the vehicle 105. The trajectory information may include one or more of a relative distance, a trajectory, a speed, a size approximation, a weight approximation, and/or other information that may indicate physical characteristics of a physical object or person.

The mobility control module 305 may be configured and/or programmed to aggregate information from navigation receiver(s) 340, such as current position and speed, along with sensed obstacles from the proximity sensor(s) 335, and interpret the aggregated information to compute a safe path towards a destination such that the vehicle 105 avoids collisions. Sensed obstacles can include other vehicles, pedestrians, animals, structures, curbs, and other random objects. In some implementations the proximity sensor(s) 335 may be configured and/or programmed to determine the lateral dimensions of the path upon which the vehicle 105 is traveling, e.g., determining relative distance from the side of a sidewalk or curb, to help aid mobility control module 305 in maintaining precise navigation on a particular path.

The navigation interface 325 may allow a rider to enter identity information, login credentials, a target destination, and other information. For example, where point of interest is a shopping center, navigation interface 325 can present information such as various stores and attractions that are located in the shopping center, hours of operation, etc. Similarly, where point of interest is a recreation center or sports center, navigation interface 325 can present information on upcoming events, ticket availability and prices, and similar such data. Such data is typically stored in a database file either located as part of memory in mobility control module 305, or possibly in navigation interface 325, if configured with a separate database.

Figure 4:
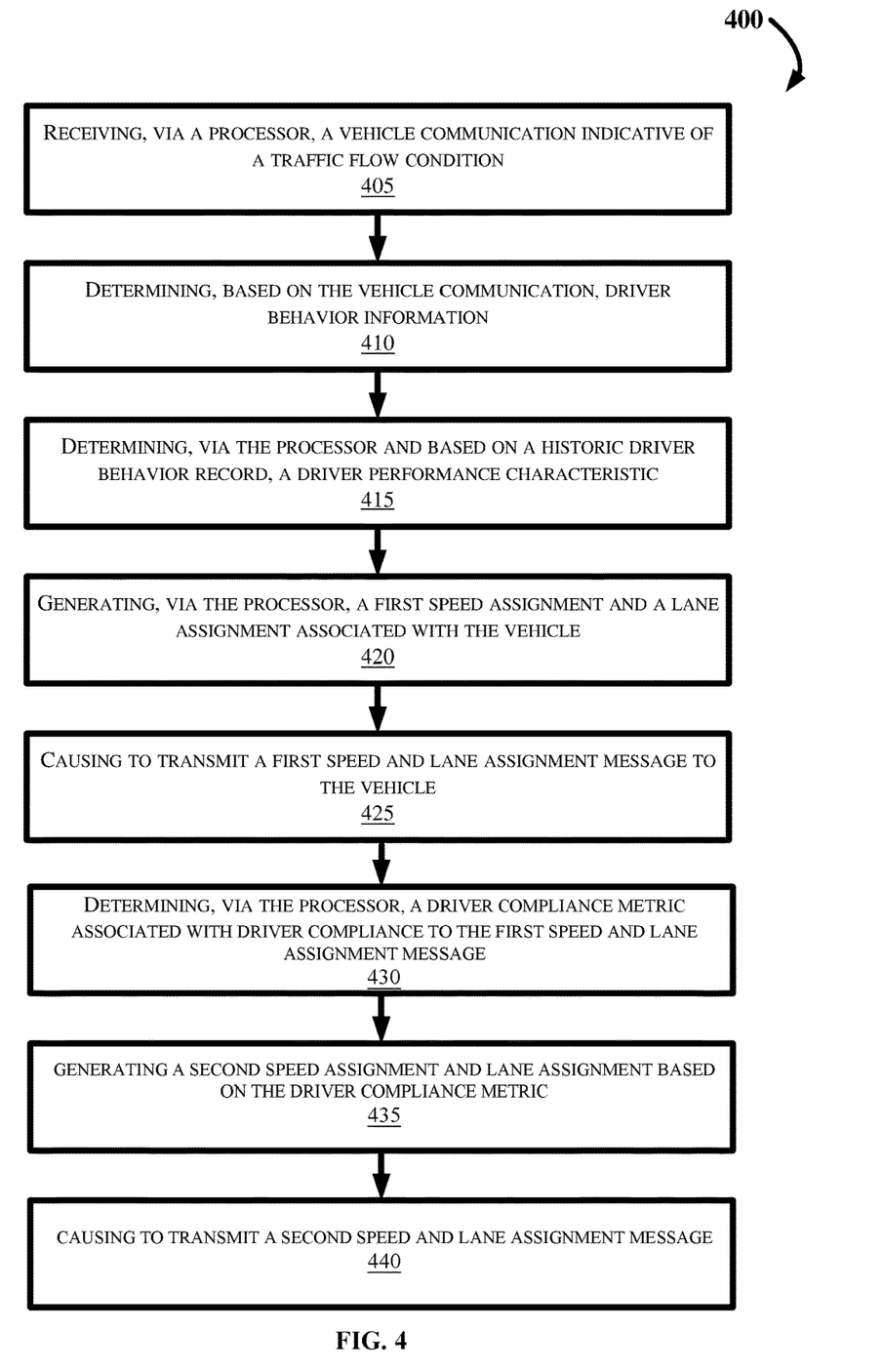
FIG. 4 depicts a flow diagram of an example method for controlling a vehicle in accordance with the present disclosure.

FIG. 4 depicts a flow diagram of an example method for controlling a vehicle in accordance with the present disclosure.

Referring first to FIG. 4, at step 405, the method 400 may commence with receiving, via a processor a vehicle communication indicative of a traffic flow condition.

At step 410, the method 400 may further include determining, based on the vehicle communication, driver behavior information. This step may include receiving information from a vehicle driven by a human driver, an autonomous vehicle, or a combination that includes a semi-autonomous vehicle driving system.

At step 415, the method 400 may further include determining, via the processor and based on a historic driver behavior record, a driver performance characteristic. This step may include receiving driving history from a datastore disposed in the vehicle control system, and/or from a datastore disposed as part of the dynamic vehicle and traffic control system.

At step 420, the method 400 may further include generating, via the processor, a first speed assignment and a lane assignment and associated with the vehicle.

At step 425, the method 400 may further include causing to transmit a first speed and lane assignment message to the vehicle. This step may include determining, via the processor, a driver compliance metric associated with driver compliance to the speed and lane assignment message, generating a second speed assignment and lane assignment based on the driver compliance metric, and causing to transmit a second speed and lane assignment message. This step may also include causing to transmit a speed assignment and lane assignment instruction to a traffic infrastructure sign, wherein the instruction is configured to cause traffic infrastructure sign to output a speed and lane assignment message.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
receiving, via a processor, a vehicle communication indicative of a traffic flow condition;
determining, based on the vehicle communication, driver behavior information;
determining, via the processor and based on a historic driver behavior record, a driver performance characteristic;
generating, via the processor, a first speed assignment and a lane assignment associated with the vehicle; and causing to transmit a first speed and lane assignment message to the vehicle;

determining, via the processor, a driver compliance metric associated with driver compliance to the first speed and lane assignment message;

generating a second speed assignment and lane assignment based on the driver compliance metric; and causing to transmit a second speed and lane assignment message.

2. The method according to claim 1, further comprising:
causing to transmit a speed assignment and lane assignment instruction to a traffic infrastructure sign, wherein the instruction is configured to cause traffic infrastructure sign to output a speed and lane assignment message.

3. The method according to claim 1, wherein the vehicle is an autonomous vehicle and the driver comprises an autonomous driving system.

4. The method according to claim 1, wherein the vehicle is one of a semi-autonomous vehicle or a non-autonomous vehicle, and the driver is a human operator.

5. The method according to claim 1, wherein the driver behavior characteristic comprises one or more of:
a count of braking actions with respect to time;
a count of acceleration actions with respect to time;
count of lane changes with respect to time; and
an average vehicle speed.

6. The method according to claim 1, further comprising:
determining, based on the vehicle communication, a vehicle speed or response rate capability; and
generating the first speed assignment and a lane assignment associated with the vehicle based on the vehicle speed or response rate capability.

7. An edge computing system, comprising:
a processor; and
a memory for storing executable instructions, the processor programmed to execute the instructions to:
receive a vehicle communication indicative of a traffic flow condition;
determine, based on the vehicle communication, driver behavior information;
determine, via the processor and based on a historic driver behavior record, a driver performance characteristic;
generate, via the processor, a first speed assignment and a lane assignment associated with the vehicle; and
cause to transmit a first speed and lane assignment message to a vehicle;
determine a driver compliance metric associated with driver compliance to the first speed and lane assignment message;
generate a second speed assignment and lane assignment based on the driver compliance metric; and
cause to transmit a second speed and lane assignment message.

8. The system according to claim 7, wherein the processor is further programmed to execute the instructions to:
cause to transmit a speed assignment and lane assignment instruction to a traffic infrastructure sign, wherein the instruction is configured to cause traffic infrastructure sign to output a speed and lane assignment message.

9. The system according to claim 7, wherein the vehicle is an autonomous vehicle and the driver comprises an autonomous driving system.

10. The system according to claim 7, wherein the vehicle is one of a semi-autonomous vehicle or a non-autonomous vehicle, and the driver is a human operator.

11. The system according to claim 7, wherein the driver behavior characteristic comprises one or more of:
a count of braking actions with respect to time;
a count of acceleration actions with respect to time;
count of lane changes with respect to time; and
an average vehicle speed.

12. The system according to claim 7, wherein the processor is further programmed to execute the instructions to:
determine, based on the vehicle communication, a vehicle speed or response rate capability; and
generate the first speed assignment and a lane assignment associated with the vehicle based on the vehicle speed or response rate capability.

13. A non-transitory computer-readable storage medium in an edge computing system, the computer-readable storage medium having instructions stored thereupon which, when executed by a processor, cause the processor to:
receive a vehicle communication indicative of a traffic flow condition;
determine, based on the vehicle communication, driver behavior information;
determine, based on a historic driver behavior record, a driver performance characteristic;
generate a first speed assignment and a lane assignment associated with the vehicle; and
cause to transmit a first speed and lane assignment message to a vehicle;
determine a driver compliance metric associated with driver compliance to the first speed and lane assignment message;
generate a second speed assignment and lane assignment based on the driver compliance metric; and
cause to transmit a second speed and lane assignment message.

14. The non-transitory computer-readable storage medium according to claim 13, having further instructions stored thereupon to:
cause to transmit a speed assignment and lane assignment instruction to a traffic infrastructure sign, wherein the instruction is configured to cause traffic infrastructure sign to output a speed and lane assignment message.

15. The non-transitory computer-readable storage medium according to claim 13, wherein the vehicle is an autonomous vehicle and the driver comprises an autonomous driving system.

16. The non-transitory computer-readable storage medium according to claim 13, wherein the vehicle is one of a semi-autonomous vehicle or a non-autonomous vehicle, and the driver is a human operator.

* * * * *